UNITED STATES PATENT OFFICE.

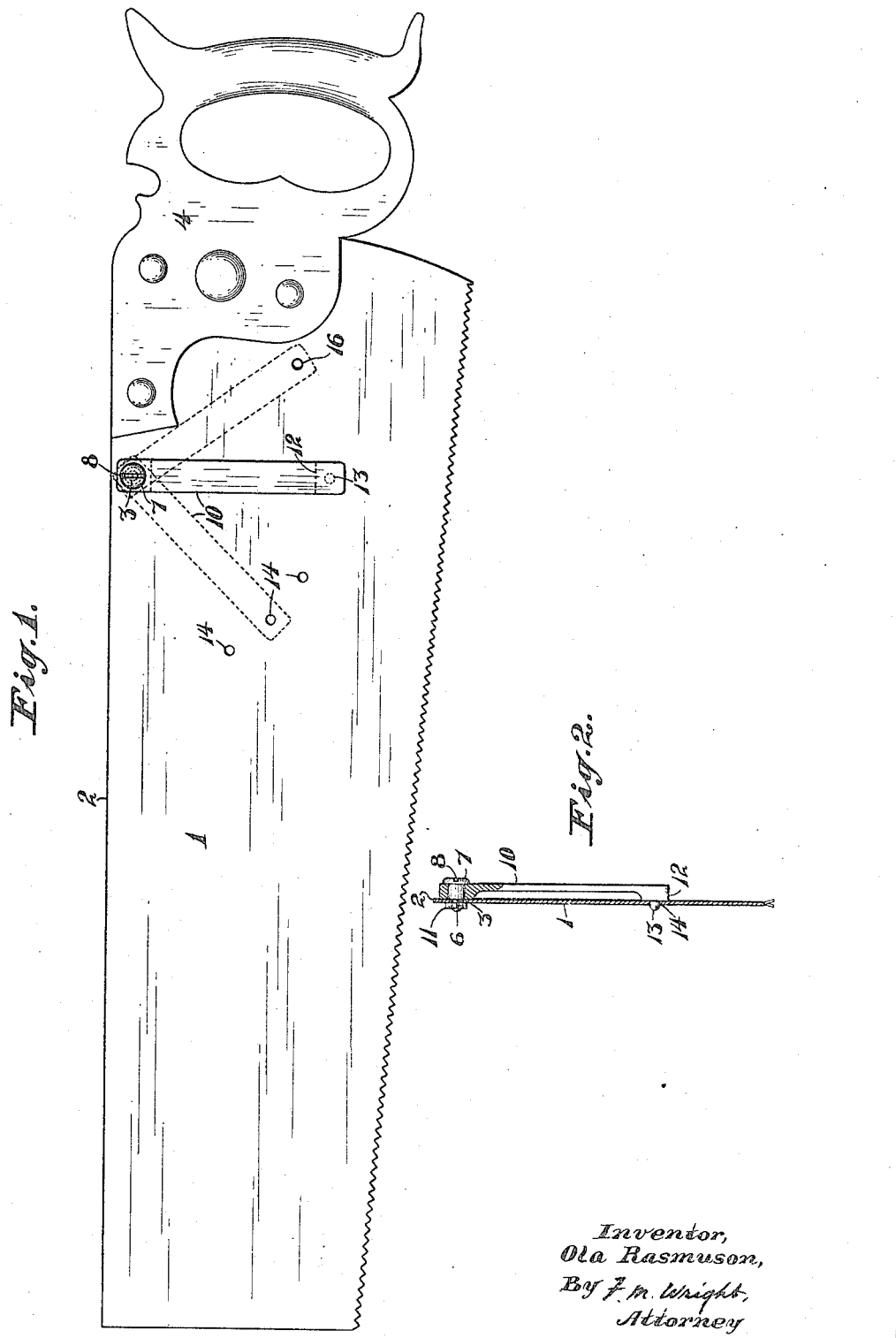

OLA RASMUSON, OF SAN FRANCISCO, CALIFORNIA.

MITER ATTACHMENT FOR SAWS.

1,187,650.

Specification of Letters Patent. Patented June 20, 1916.

Application filed October 4, 1915. Serial No. 53,910.

*To all whom it may concern:*

Be it known that I, OLA RASMUSON, a citizen of the United States, residing at San Francisco, in the county of San Francisco and State of California, have invented new and useful Improvements in Miter Attachments for Saws, of which the following is a specification.

The object of the present invention is to provide a simple and inexpensive device which can be attached to a hand saw blade having a straight back to convert the same into square, miter or bevel.

In the accompanying drawing, Figure 1 is a side view of a saw equipped with my invention; Fig. 2 is a transverse sectional view of the same.

Referring to the drawing, 1 indicates a hand saw having a straight back edge 2. A hole 3 is made through the saw blade in the corner near the back edge and the handle 4, and through said hole is passed a reduced threaded portion of a pivot pin 6, having a thin flat head 7 formed with a diametral slot 8 to facilitate the screwing of the pivot pin through the saw. A smooth cylindrical portion of the pivot pin extends through a hole in a thickened end of a bar 10 having straight edges and formed of spring metal. Said threaded portion of the pivot pin is screwed into said saw blade until the square shoulder formed by the end of the smooth rounded portion of the pivot pin abuts against the saw blade. A nut 11 is then screwed on the threaded portion of the pivot pin until it abuts against the other side of the saw blade, so that the pin is rigidly secured to the saw blade. By reason of the square shoulder abutting against the saw blade on one side, and the head 7 having a flat surface properly spaced from the saw blade on the other side the bar can swing freely on the smooth cylindrical portion of the pivot pin. The free end of the bar is also thickened, as shown at 12, and from the inner surface of said thickened end extends a projection 13 which can enter any one of a number of holes 14 through the saw blade, which are located in such positions that when the pin enters one of said holes, the bar is at right angles, or at an angle of 30°, 45° or 60°, with the back of the saw blade. A hole 16 is also provided to receive the projection 13 to hold the bar as close as possible to the handle when the attachment is not intended to be used.

It will be readily understood that the bar can be applied to the edge of a board or the like and the back edge of the saw will then extend at any desired angle from said edge over the surface of the board, so that said surface may be readily marked to enable the board to be cut at the angle desired, either at right angles, or at an angle of 45°, or of 30° or 60°, if desired. It will also be seen that the angle may be very quickly changed by removing the projection 13 from one of the holes 14 and inserting it in another. The bar can be attached on either side of the saw as desired.

This attachment will be found especially convenient when working on scaffolding where it is difficult to take care of many tools.

I claim:—

An attachment for a hand saw comprising a pin having a smooth cylindrical portion forming a pivot, said pivot pin having a flat head to abut against the side of the bar remote from the saw, a reduced threaded portion adapted to extend through a hole adjacent to the straight edge of a saw, and a square shoulder between said portions adapted to abut against a side of the saw around the hole, a nut upon said threaded portion fixedly, but removably, securing said pin to said saw, and a spring metal bar having one end pivoted on said pin, and having a fixed projection from the other end in the same direction as the pin and adapted to enter any one of a circular series of holes in the saw about the pin hole as center.

In testimony whereof I have hereunto set my hand in the presence of two subscribing witnesses.

OLA RASMUSON.

Witnesses:
F. M. WRIGHT,
D. B. RICHARDS.

Copies of this patent may be obtained for five cents each, by addressing the "Commissioner of Patents, Washington, D. C."